US012570185B2

(12) United States Patent
Jones et al.

(10) Patent No.: US 12,570,185 B2
(45) Date of Patent: Mar. 10, 2026

(54) REMOVABLE COMPONENT SYSTEM

(71) Applicant: Lear Corporation, Southfield, MI (US)

(72) Inventors: Jeffrey A. Jones, Ann Arbor, MI (US); Raúl Ricart, Valls (ES); Antoni Ferré Fàbregas, Valls (ES)

(73) Assignee: Lear Corporation, Southfield, MI (US)

( * ) Notice: Subject to any disclaimer, the term of this patent is extended or adjusted under 35 U.S.C. 154(b) by 1039 days.

(21) Appl. No.: 17/688,079

(22) Filed: Mar. 7, 2022

(65) Prior Publication Data

US 2023/0278469 A1 Sep. 7, 2023

(51) Int. Cl.
| | |
|---|---|
| *B60N 2/08* | (2006.01) |
| *B60N 2/015* | (2006.01) |
| *B60N 2/02* | (2006.01) |
| *B60N 2/30* | (2006.01) |
| *B60N 2/856* | (2018.01) |

(52) U.S. Cl.
CPC ....... *B60N 2/0881* (2013.01); *B60N 2/01516* (2013.01); *B60N 2/3018* (2013.01); *B60N 2/3034* (2013.01); *B60N 2/3043* (2013.01); *B60N 2/307* (2013.01); *B60N 2/856* (2018.02); *B60N 2002/0216* (2013.01); *B60N 2205/30* (2013.01)

(58) Field of Classification Search
CPC ......... B62D 25/00; B60R 22/00; B60R 21/00; G05B 19/042; B60N 2/90; B60N 2/24; B60N 2/04; B60N 2/02
USPC ......................................... 701/45; 180/89.11
See application file for complete search history.

(56) References Cited

U.S. PATENT DOCUMENTS

| | | | |
|---|---|---|---|
| 5,255,184 A | 10/1993 | Hornick et al. | |
| 9,333,880 B2 | 5/2016 | Farquhar et al. | |
| 9,383,872 B2 | 7/2016 | Yetukuri et al. | |
| 9,451,020 B2 | 9/2016 | Liu et al. | |
| 9,911,243 B2 | 3/2018 | Vats | |
| 10,147,325 B1 | 12/2018 | Copeland et al. | |
| 10,216,188 B2 | 2/2019 | Brady et al. | |
| 10,279,703 B2 | 5/2019 | Lota | |
| 10,399,462 B2 | 9/2019 | Yamada | |
| 10,696,189 B2 * | 6/2020 | Brackenbury | ........ B60R 16/037 |
| 10,857,909 B2 * | 12/2020 | Yetukuri | ............. B60N 2/0022 |
| 11,052,786 B2 | 7/2021 | Ajisaka | |

(Continued)

OTHER PUBLICATIONS

Copending U.S. Appl. No. 17/110,669.
Copending U.S. Appl. No. 17/078,706.

*Primary Examiner* — Paul N Dickson
*Assistant Examiner* — Caitlin Anne Miller
(74) *Attorney, Agent, or Firm* — McGarry Bair PC

(57) ABSTRACT

A removable component system may include a vehicle, a plurality of removable components, one or more sensor assemblies, and/or an electronic control unit that may be connected to the one or more sensors. A method of operating the removable component system may include moving, via the electronic control unit, a first removable component of the plurality of removable components relative to a mounting surface of the vehicle, detecting a new removable component or removal of a second removable component of the plurality of removable components while moving the first removable component, and/or modifying the movement of the first removable component according to the detected new removable component and/or the removal of the second removable component.

19 Claims, 10 Drawing Sheets

(56)          References Cited

U.S. PATENT DOCUMENTS

| | | | |
|---|---|---|---|
| 11,124,090 B2 * | 9/2021 | Yetukuri | B60N 2/0028 |
| 11,590,862 B2 * | 2/2023 | Yetukuri | H04L 67/306 |
| 11,634,101 B2 * | 4/2023 | Ricart | B60R 22/48 |
| | | | 701/45 |
| 11,726,940 B2 * | 8/2023 | Ricart | B60N 2/0272 |
| | | | 710/301 |
| 12,049,178 B2 * | 7/2024 | Jones | B60R 16/0232 |
| 2003/0046179 A1 | 3/2003 | Anabtawi et al. | |
| 2004/0249685 A1 | 12/2004 | Douglas | |
| 2006/0276960 A1 | 12/2006 | Adamczyk et al. | |
| 2012/0101891 A1 | 4/2012 | Collier et al. | |
| 2013/0054279 A1 | 2/2013 | Sharp et al. | |
| 2014/0164188 A1 | 6/2014 | Zabawa et al. | |
| 2014/0214696 A1 | 7/2014 | Laughlin et al. | |
| 2014/0306500 A1 | 10/2014 | Dryburgh et al. | |
| 2015/0317568 A1 | 11/2015 | Grasso et al. | |
| 2016/0264021 A1 | 9/2016 | Gillett | |
| 2016/0379631 A1 | 12/2016 | Wang et al. | |
| 2018/0029716 A1 | 2/2018 | Sieben | |
| 2018/0039917 A1 | 2/2018 | Buttolo et al. | |
| 2018/0072188 A1 | 3/2018 | Yamada | |
| 2018/0154799 A1 | 6/2018 | Lota | |
| 2018/0244175 A1 | 8/2018 | Tan | |
| 2018/0275648 A1 | 9/2018 | Ramalingam | |
| 2019/0026886 A1 | 1/2019 | Ferguson et al. | |
| 2019/0035282 A1 | 1/2019 | Ferguson et al. | |
| 2019/0057481 A1 | 2/2019 | Zhang et al. | |
| 2019/0347580 A1 | 11/2019 | Jiwani et al. | |
| 2020/0047641 A1 | 2/2020 | D'Eramo et al. | |
| 2020/0055423 A1 | 2/2020 | Prozzi et al. | |
| 2020/0171979 A1 * | 6/2020 | Yetukuri | B60N 2/01 |
| 2020/0189418 A1 | 6/2020 | Sailer et al. | |
| 2021/0046888 A1 | 2/2021 | Vardharajan | |
| 2021/0178936 A1 * | 6/2021 | Yetukuri | H04L 67/306 |

* cited by examiner

200

202

Provide Removable Components,
Sensor(s), and/or ECU

204

Receive Request

206

Move 1st Removable Component

208

Detect New Removable Component or
Removal of Removable Component

210

Modify Movement of
1st Removable Component

REMOVABLE COMPONENT SYSTEM

TECHNICAL FIELD

The present disclosure generally relates to systems for removable components, such as removable component systems that may, for example, be utilized in connection with and/or incorporated into vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some systems for removable components may not provide sufficient functionality. Some systems may not be configured to continuously monitor removable components within a vehicle, detect changes to the removable components, and/or modify the function of certain removable components based on the detected changes.

There is a desire for solutions/options that minimize or eliminate one or more challenges or shortcomings of removable component systems. The foregoing discussion is intended only to illustrate examples of the present field and is not a disavowal of scope.

SUMMARY

In embodiments, a removable component system may include a vehicle, a plurality of removable components, one or more sensor assemblies, and/or an electronic control unit that may be connected to the one or more sensors. With embodiments, a method of operating the removable component system may include moving, via the electronic control unit, a first removable component of the plurality of removable components relative to a mounting surface of the vehicle, detecting a new removable component or removal of a second removable component of the plurality of removable components while moving the first removable component, and/or modifying the movement of the first removable component according to the detected new removable component and/or the removal of the second removable component.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
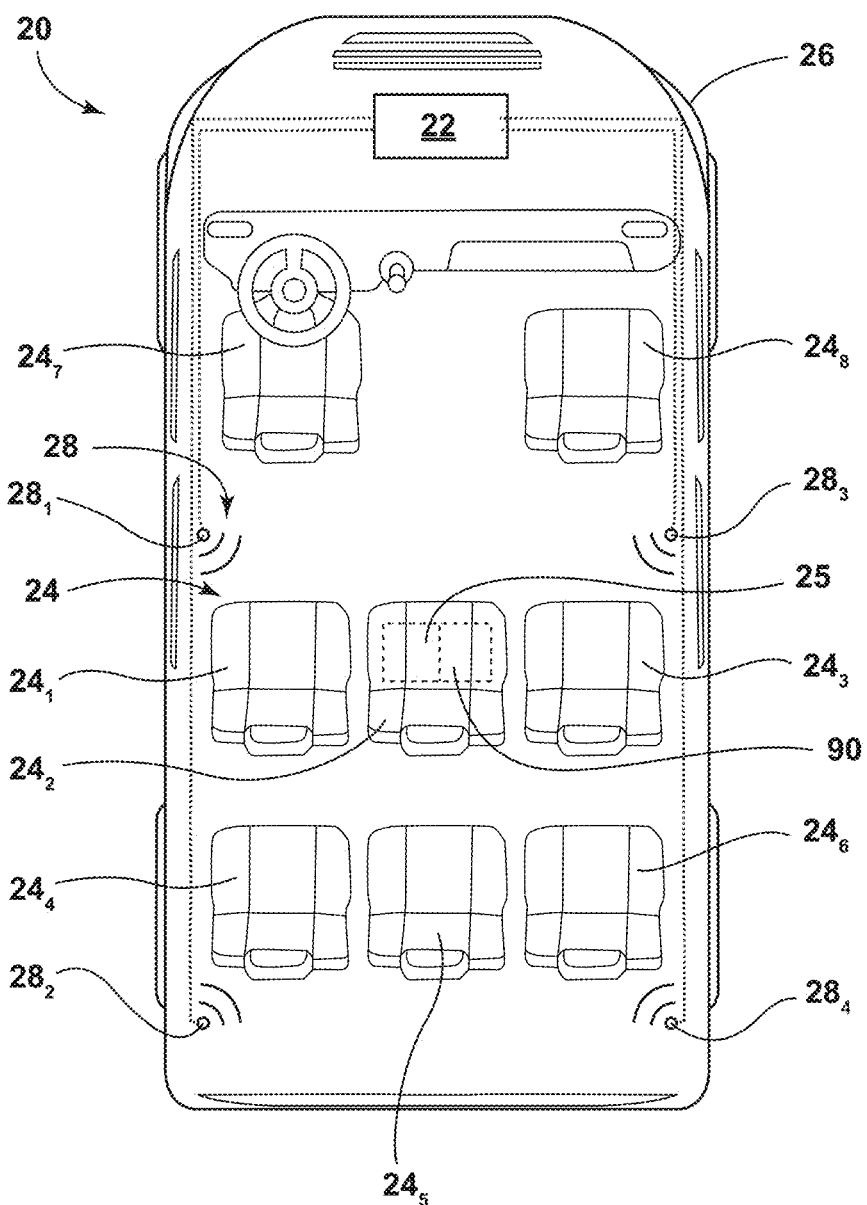
FIG. 1 is a top view generally illustrating an embodiment of a removable component system according to teachings of the present disclosure.

In embodiments, such as generally illustrated in FIG. 1, a removable component system 20 may include an electronic control unit (ECU) 22 and/or one or more removable components 24. In some instances, the system 20 may include, connected to, incorporated with, and/or be disposed at least partially within a vehicle 26. For example, the one or more removable components 24 (e.g., a first removable component 24$_1$, a second removable component 24$_2$, a third removable component 24$_3$, a fourth removable component 24$_4$, a fifth removable component 24$_5$, a sixth removable component 24$_6$, a seventh removable component 24$_7$, and/or an eighth removable component 24$_8$) may be disposed at and/or removed from different locations within the vehicle 26.

With embodiments, an ECU 22 may be connected (e.g., electrically) to one or more transceivers 28, such as a first transceiver 28$_1$, a second transceiver 28$_2$, a third transceiver 28$_3$, and/or a fourth transceiver 28$_4$ (see, e.g., FIG. 1). The one or more transceivers 28 may be configured to communicate with the ECU 22. In some instances, the one or more transceivers 28 may be configured to transmit information from the ECU 22 to one or more removable components 24 and/or to receive information from the one or more removable components 24 and provide the received information to the ECU 22. In some examples, the one or more transceivers 28 may be disposed at various locations throughout the vehicle 26.

In embodiments, a vehicle 26 may include one or more of a variety of configurations. For example and without limitation, a vehicle 26 may include a land vehicle, a passenger car, a van, a sport utility vehicle (SUV), a crossover, a truck (e.g., a pickup truck, a commercial truck, etc.), a bus, a watercraft, an aircraft (e.g., a plane, a helicopter, etc.), and/or a combination thereof (e.g., a vehicle for land and water, a vehicle for air and water, etc.), among others. With embodiments, such as generally illustrated in FIG. 2, a vehicle 26 may include one or more mounting surfaces 30 (e.g., a vehicle interior, a vehicle exterior, etc.) that may be configured for selective connection with one or more removable components 24.

Figure 2:
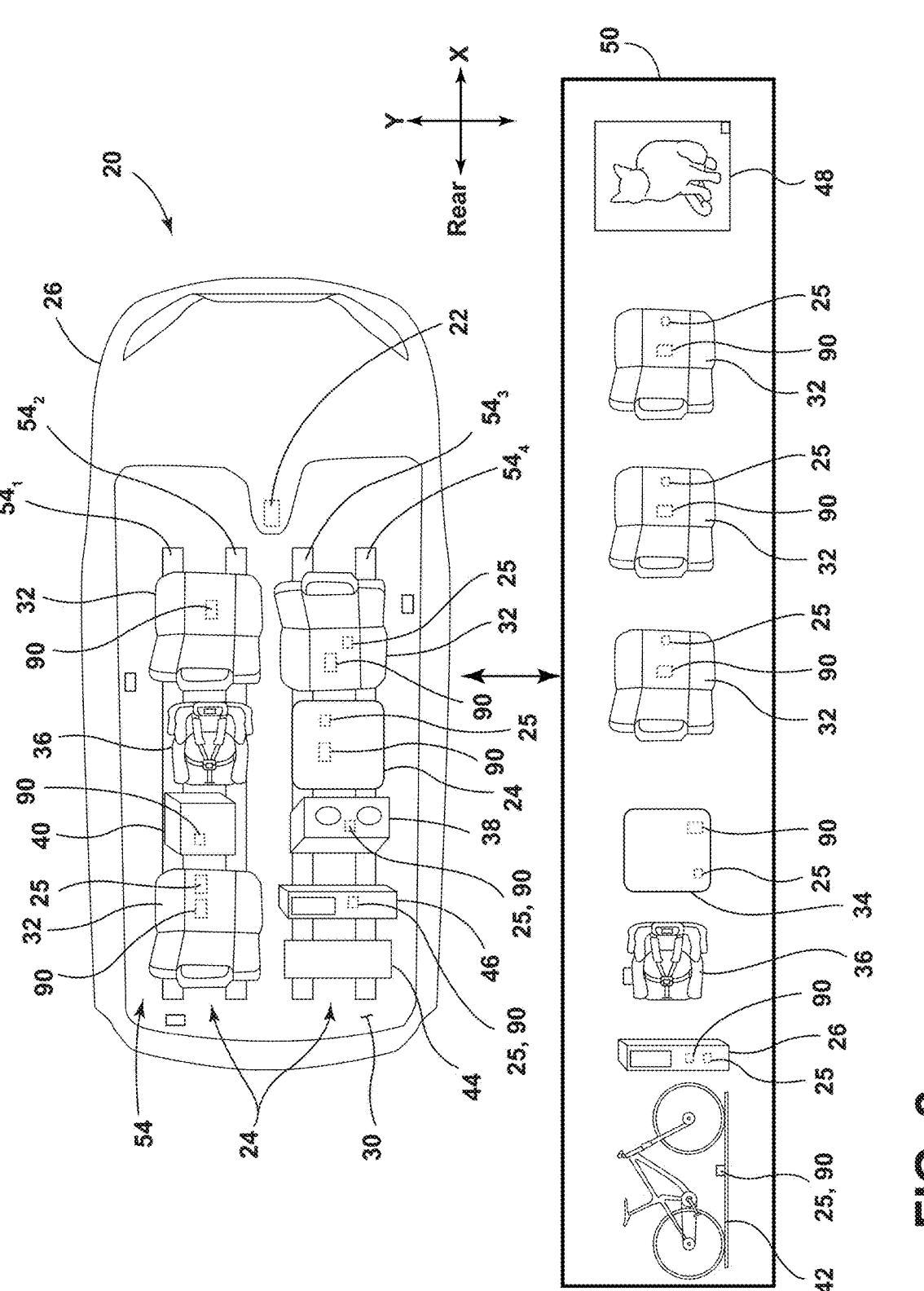
FIG. 2 is representation generally illustrating embodiments of a vehicle with removable components and a storage facility with removable components according to teachings of the present disclosure.

With embodiments, such as generally illustrated in FIG. 2, removable components 24 may, for example and without limitation, include vehicle seats 32, tables 34, child seats 36 (e.g., car seats for children), power outlets 38 (e.g., AC outlets and/or DC outlets), appliances 40 (e.g., refrigerators, freezers, coffee makers, etc.), mounting racks 42 (e.g., bike racks, kayak racks, ski racks, etc.), consoles 44, lights 46, and/or pet crates 48, among others. Removable components 24 may be configured for selective connection with, movement within, movement along and relative to, and/or removal from the vehicle interior and/or exterior. For example, removable components 24 may be removed in a vertical direction from a mounting surface 30 and/or a track/rail assembly 52. Removable components 24 may include electrical components (e.g., components with electrical loads/elements) and/or may include non-electrical components (e.g., without electrical loads/elements). Removable components 24 may, for example, be stored, at least temporarily, in a storage facility 50 (e.g., a warehouse, shed, etc.), such as when not connected or installed with a vehicle 26.

In embodiments, such as generally illustrated in FIGS. 2, 3, and 7A-7D, a vehicle 26 and/or a mounting surface 30 may include a track/rail assembly 52 that may be connected (e.g., fixed) to and/or in a mounting surface 30, such as of/in a vehicle 26. A track/rail assembly 52 may include one or more tracks 54, such as a first track $54_1$, a second track $54_2$, a third track $54_3$, a fourth track $54_4$, a fifth track $54_5$, and/or a sixth track $54_6$ that may extend substantially parallel to each other (e.g., in a longitudinal/X-direction), such as generally illustrated in FIGS. 7A-7D. The tracks 54 may, for example, be spaced from each other, such as in a lateral direction of the vehicle 26 (e.g., a Y-direction). A track/rail assembly 52 may include other track/rail configurations (e.g., non-parallel tracks, angled tracks, rounded tracks, etc.). The one or more removable components 24 may, with some embodiments, be selectively/releasably connected to (e.g., mechanically and/or electrically), move (e.g., slide) along and relative to, and/or be removed from the mounting surface 30 via the track assembly 52, such as, in some examples, without additional or external tools (e.g., may be selectively secured to and removed in a Z-direction from the track assembly 52 in a plurality or positions/orientations along the track assembly 52).

Figure 3:
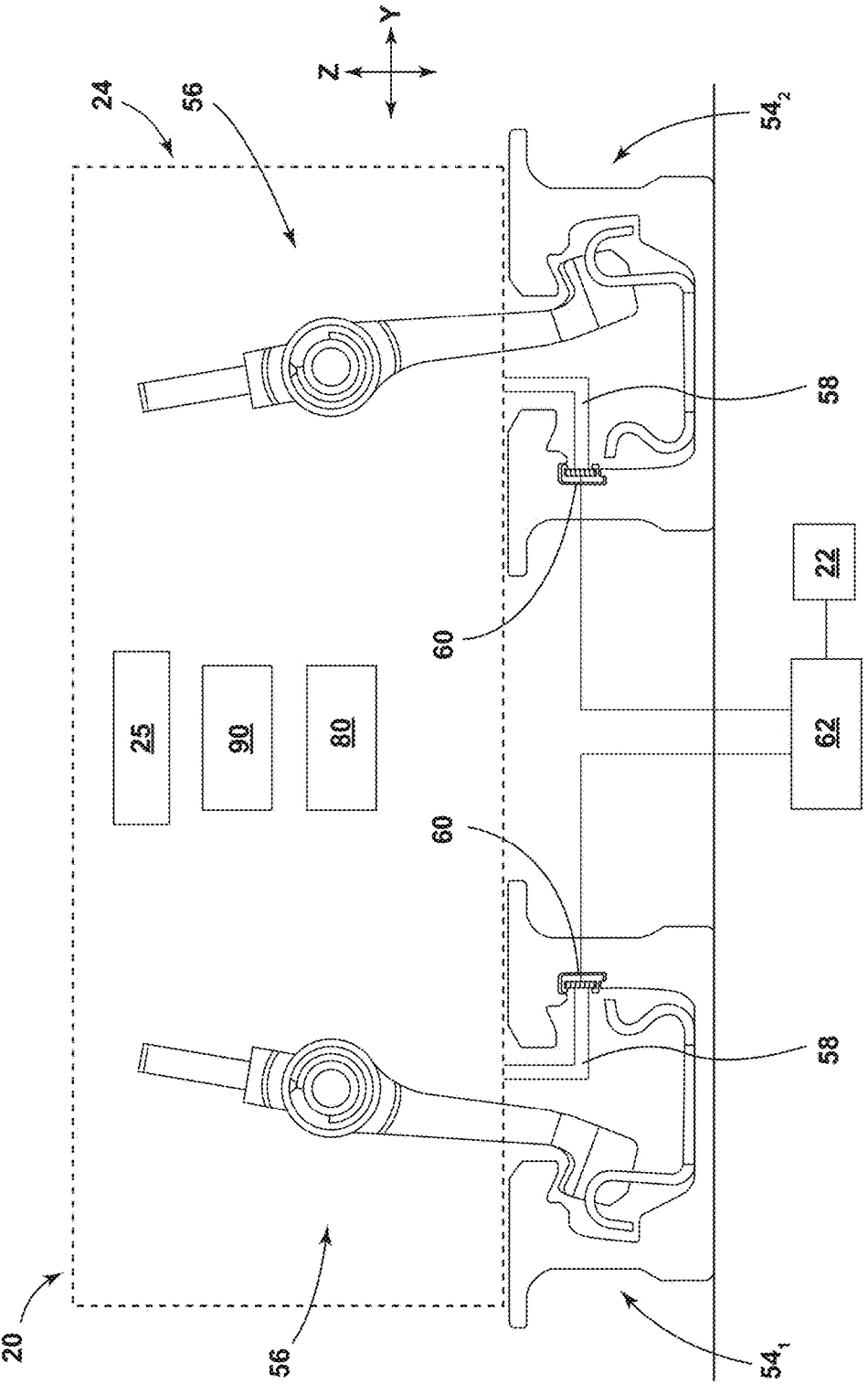
FIG. 3 is an end view generally illustrating an embodiment of a track assembly of a vehicle and a removable component according to teachings of the present disclosure.

With embodiments, a removable component 24 may, for example and without limitation, include one or more latches/anchors 56 that may be configured to selectively engage and/or contact the track assembly 52 to restrict or prevent movement of a component 24 in one or more directions (e.g., an X direction and/or a Z-direction of the track assembly 52), and/or one or more electrical contacts 58 that may be configured to selectively contact a conductor 60 of a track assembly 52, such as to provide power from a power source 62 (e.g., a vehicle battery) to the component 24 (see, e.g., FIG. 3). The one or more latches/anchors 56 and/or the one or more electrical contacts 58 may be actuated (e.g., rotated, translated, etc.) between engaged/connected positions and disengaged/disconnected positions in one or more of a variety of ways, such as mechanically (e.g., via a lever/slider/cable, manually, etc.) and/ or electronically (e.g., via an electric actuator/motor). The one or more latches/anchors 56 and/or the one or more electrical contacts 58 may restrict insertion/removal of a component 24 from the track assembly 52 when in engaged/connected positions, and/or may not restrict insertion/removal of a component 24 when in disengaged/disconnected positions.

In embodiments, such as generally illustrated in FIGS. 4, 5A-5D, and 7A-7D, removable components 24, such as seats 32 or other components, may be configured to move (e.g., longitudinally, laterally/transversely, vertically, rotationally, angularly, etc.). The removable components 24, such as seats 32 or other components, may be moved in response to input from a user.

Figure 6:
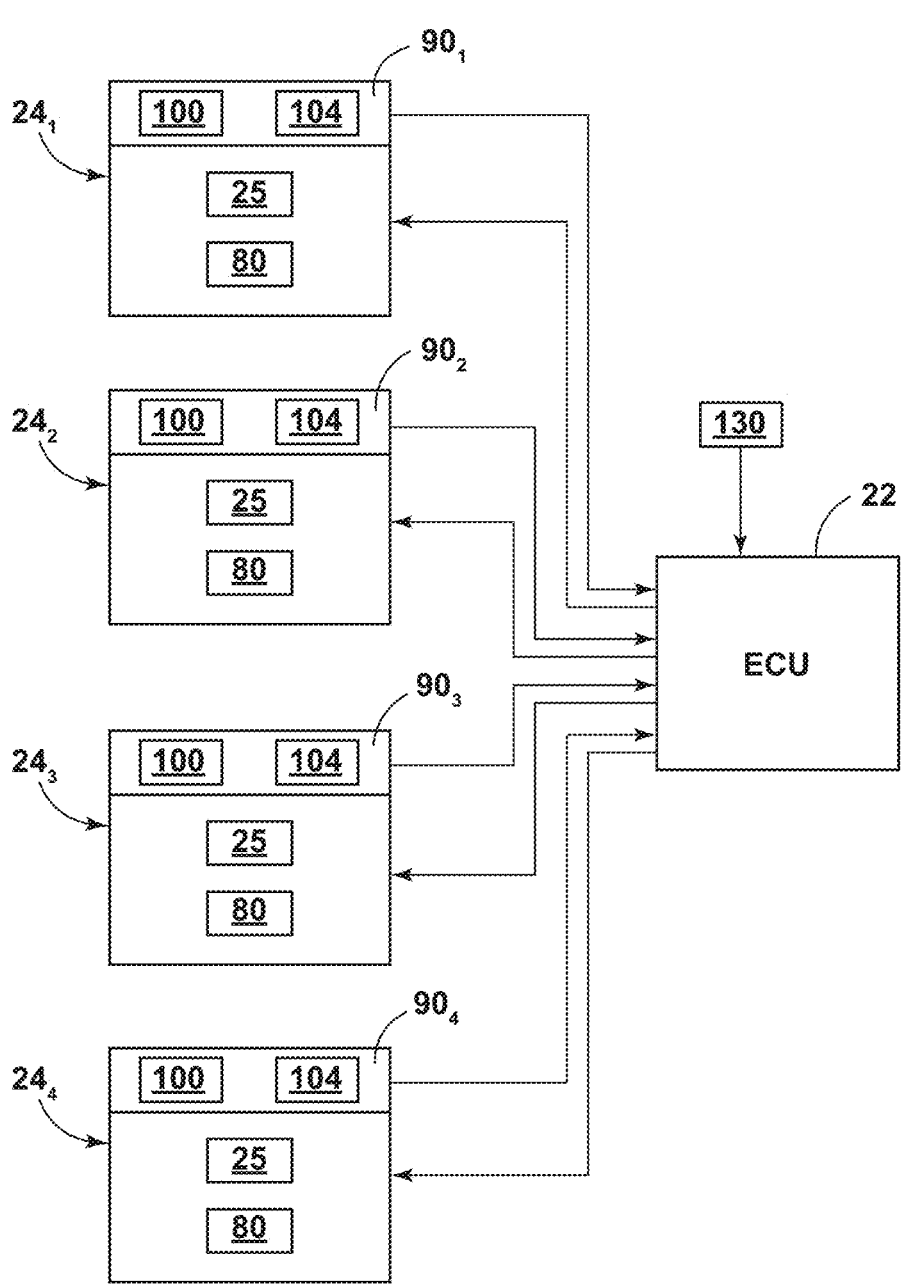
FIG. 6 is a schematic generally illustrating connections of an embodiment of a removable component system according to teachings of the present disclosure.

With embodiments, an ECU 22 may be configured to control movement of the removable components 24, such as vehicle seats 32. The ECU 22 may be connected to and/or incorporated with a vehicle electronics system. As generally illustrated in FIGS. 6, the ECU 22 may be connected to actuators 80 (e.g., electric motors) of some or each of the removable components 24 (e.g., the first removable component $24_1$, the second removable component $24_2$, the third removable component $24_3$, and/or the fourth removable component $24_4$). The ECU 22 may be configured to automatically move the first removable component $24_1$, the second removable component $24_2$, the third removable component $24_3$, and/or the fourth removable component $24_4$ via the actuators 80, such as according to input from a user (e.g., via a user request). The ECU 22 may be configured to automatically move the removable components 24 without any input from the user.

In embodiments, such as generally shown in FIGS. 5A-5D, removable components 24, such as seats 32, may each include a seat base 70 and/or a seat back 72 (see, e.g., FIGS. 5A-5D). For example and without limitation, movement of the seats 32, may include one or more of a variety of different types of movements. A first type of movement may include tilting/angling the seat base 70 and/or tilting/angling the seat back 72. The ECU 22 may move/tilt the seat back 72 between a substantially horizontal position (see, e.g., FIG. 5B) and a substantially vertical position (see, e.g., FIG. 5C and 5D). Additionally or alternatively, the ECU 22 may be configured to move the seat base 70 between a substantially horizontal position (see, e.g., FIG. 5A and 5B) and a substantially vertical position (see, e.g., FIG. 5D). The seats 32 may include a position in which the seat back 72 and the seat base 70 may both be substantially vertical (see, e.g., FIG. 5D). The seats 32 may include a position in which the seat back 72 and the seat base 70 may both be substantially horizontal.

With embodiments, the ECU 22 may be configured to control movement of the seat bases 70 of the seats 32, such as in a vertical direction Z. For example and without limitation, the ECU 22 may cause a seat 32 to move between a lower vertical position (see, e.g., FIG. 5A) and a higher vertical position (see, e.g., FIG. 5B). In embodiments, the ECU 22 may be configured to control movement of the seat 32 in a longitudinal direction X (see, e.g., FIG. 5B) and/or a lateral/transverse direction Y that may be substantially perpendicular to the longitudinal direction and/or the vertical direction Z.

Figure 4:
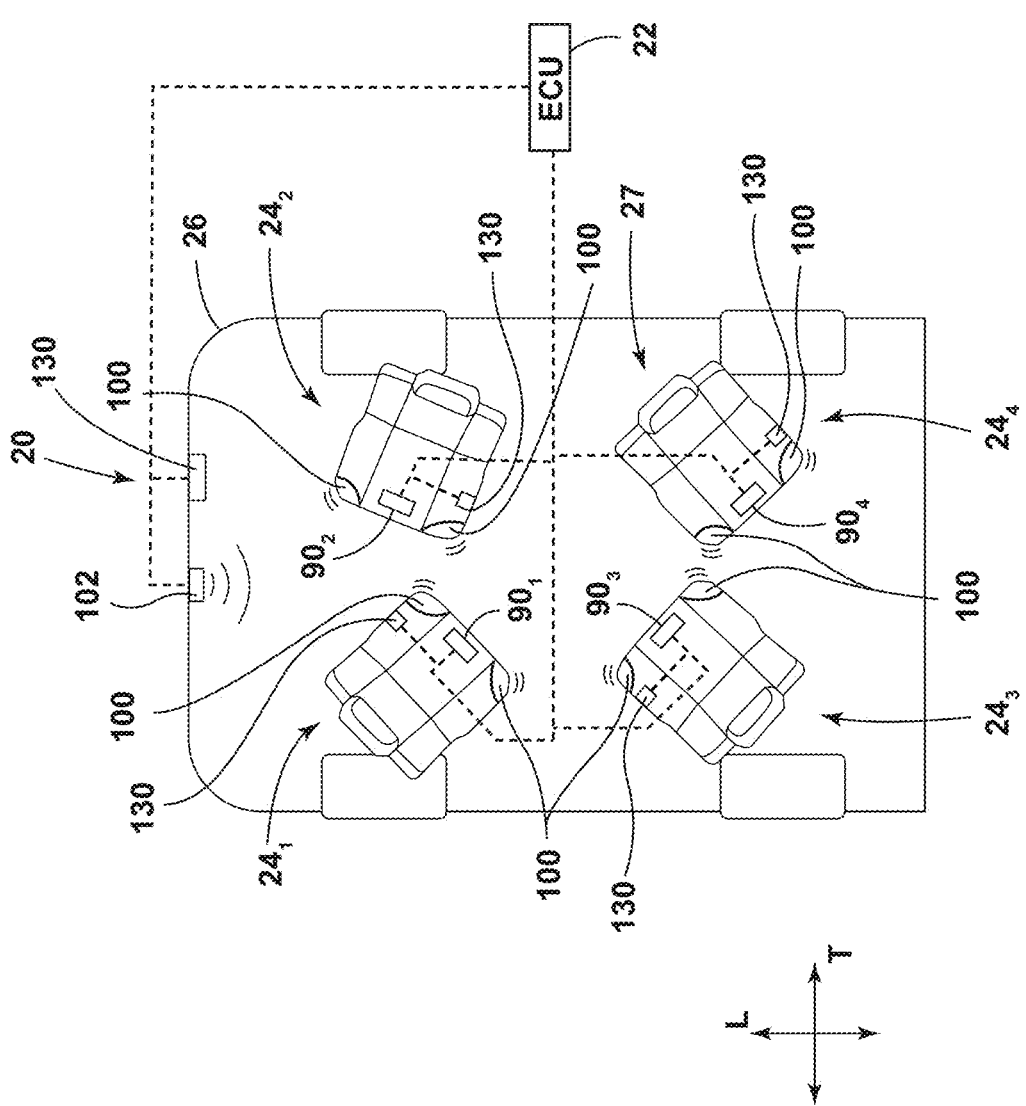
FIG. 4 is a top view generally illustrating an embodiment of a removable component system according to teachings of the present disclosure.
Figures 5A, 5B, 5C, 5D:
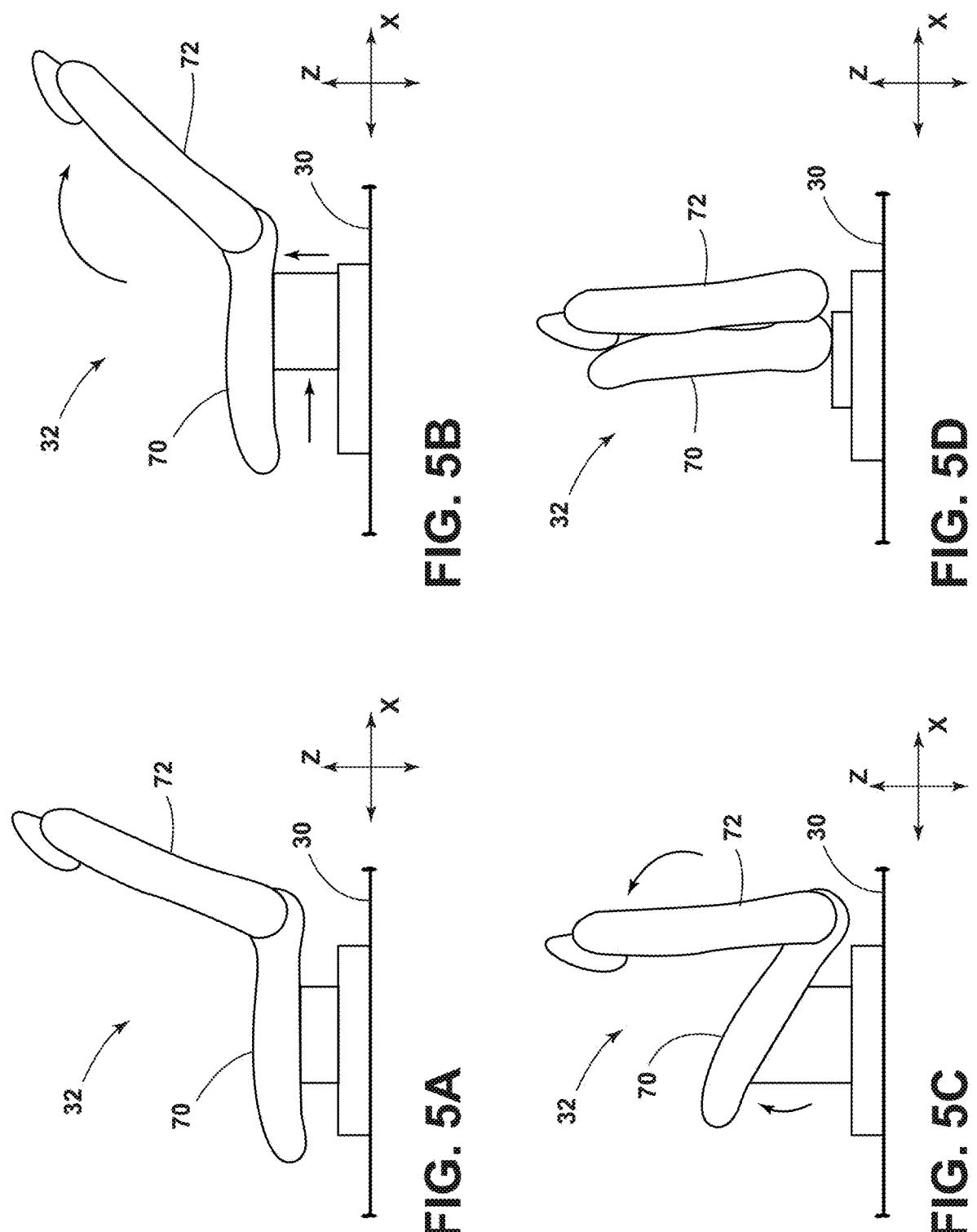
FIG. 5A, 5B, 5C, and 5D are side views generally illustrating embodiments of removable components including vehicle seats in various positions according to teachings of the present disclosure.

With embodiments, such as generally illustrated in FIG. 4, the ECU 22 may be configured to control rotational movement of the removable components 24, such as seats 32. The ECU 22 may be configured to rotate the first removable component $24_1$, the second removable component $24_2$, the third removable component $24_3$, and/or the fourth removable component $24_4$ to a plurality of angular positions (e.g., relative to an initial/forward direction), such as about 90 degrees, 180 degrees, 360 degrees, and/or positions between or beyond such positions. The ECU 22 may be configured to rotate the first removable component 24₁, the second removable component 24₂, the third removable component 24₃, and/or the fourth removable component 24₄ in a clockwise direction and/or counterclockwise direction. In embodiments, rotation of the removable component 24, such as seats 32, may occur simultaneously with vertical, lateral/transverse, and/or longitudinal movement.

In embodiments, a system 20 may include one or more sensor assemblies 90, which may each include one or a combination of a proximity sensor, a camera, an occupancy sensor, an orientation sensor, a received signal strength indication (RSSI) sensor/antenna, an angle of arrival (AoA) sensor, a time-of-flight (TOF) sensor, a global positioning system (GPS) sensor/antenna, and/or a suitable component configured to obtain location information, among others. A sensor assembly 90 may additionally or alternatively include other sensors, such as electrical characteristic sensors (e.g., current, voltage, battery charge level, etc.), among others.

With embodiments, such as generally illustrated in FIG. 6, a first sensor assembly 90₁, a second sensor assembly 90₂, a third sensor assembly 90₃, and/or the fourth sensor assembly 90₄ may be connected to the first removable component 24₁, the second removable component 24₂, the third removable component 24₃, and/or the fourth removable component 24₄, respectively.

In some example configurations, removable components 24, such as seats 32 or other components, may include respective component controllers 25. The respective component controllers 25 may be disposed within the removable component 24. With some configurations, a component controller 25 may be configured to communicate with a sensor assembly 90 and/or ECU 22 (e.g., via wireless and/or wired connection). A component controller 25 may provide information obtained via the sensor assembly 90 to the ECU 22. For example, a component controller 25 may include and/or be connected to a transceiver 28. Additionally or alternatively, a sensor assembly 90 may be configured to communicate (e.g., directly) with the ECU 22.

Sensors of a sensor assembly 90 may, for example and without limitation, be disposed in a removable component 24 and/or be attached to an outer surface of a removable component 24 (e.g., the seat base 70 and/or the seat back 72 of a seat 32). A sensor assembly 90 may include a plurality of sensors that may be disposed at different portions of the respective removable components 24. Alternatively, a sensor assembly 90 may include a single sensor.

With embodiments, sensor assemblies 90 may be configured to sense (e.g., measure, obtain, gather, detect, etc.) information about one or more removable components 24, and/or about a mounting location of the removable components 24 (e.g., about a vehicle 26). For example and without limitation, a sensor assembly 90 may be configured to sense a distance between two (or more) removable components 24. The ECU 22 may be connected to the one or more sensor assemblies 90 to determine the positions of and/or distance between removable components 24 in the vehicle 26, such as via proximity sensors 100 (e.g., ultrasonic sensors, capacitive sensors, inductive sensors, etc.) of the one or more sensor assemblies 90.

In some instances, a sensor assembly 90 may be configured to determine, at least in part, which tracks 54 of a track assembly 52 the removable component 24 is connected to, the orientation of the removable component 24, and/or the position of the removable component 24 along one or more tracks 54. Such location information may, for instance, be derived by radio-frequency triangulation, time-of-flight, and/or angle-of-arrival via sensors or may be via a GPS sensor.

With embodiments, such as generally illustrated in FIG. 4, a sensor assembly 90 may include a camera 102. The camera 102 may be used to capture image and/or video information of an interior 27 of a vehicle 26 (e.g., the first removable component 24₁, the second removable component 24₂, the third removable component 24₃, the fourth removable component 24₄, the mounting surface 30, etc.). For example and without limitation, the camera 102 may be disposed at a front of the vehicle 26, on the ceiling of the vehicle 26, and/or above the first removable component 24₁, the second removable component 24₂, the third removable component 24₃, and/or the fourth removable component 24₄. The ECU 22 may be connected to the camera 102 and/or the ECU 22 may receive information from the camera 102. The information may be in the form of one or more images/frames, which the ECU 22 may use to determine positions of the removable component 24 and/or zones of the vehicle 26. The ECU 22 may utilize image processing to create a map (e.g., a 2-D map, a 3-D map, etc.) of the interior 27 of the vehicle 26 via the information/image(s) supplied from the camera 102. In embodiments, a sensor assembly 90 may include more than one camera 102.

In embodiments, such as generally illustrated in FIG. 6, a sensor assembly 90 may include an occupancy sensor 104. The occupancy sensor 104 may be configured to determine whether a removable component 24 (e.g., a seat 32) is occupied, such as by an occupant. The occupancy sensor 104 may be configured to determine whether a particular removable component 24 is occupied, whether all the removable components 24 are occupied, and/or whether a plurality of the removable components 24 are occupied. The removable components 24 may include a respective occupancy sensor 104. The occupancy sensor 104 may be a force sensor (e.g., configured to sense a force exerted upon the seat base 70). Additionally or alternatively, the ECU 22 may be configured to receive information from the camera 102 to determine whether a removable component 24 occupied.

With embodiments, the ECU 22 may be connected to one or more sensor assemblies 90. In embodiments, the removable components 24 may each include one or more sensor assemblies 90 that may be connected to the ECU 22 and/or respective component controllers 25. The ECU 22 may be connected to actuators 80 (e.g., electric motors) and/or the component controllers 25 of the removable components 24. The ECU 22 may control the actuators 80 to control movement (e.g., vertical, longitudinal, rotational, and/or angular/tilt) of the removable components 24.

In embodiments, the ECU 22 may determine the positions (e.g., current positions) of the removable component 24 according to information from the one or more sensor assemblies 90. Determining the position may include determining the tilt/angular position, longitudinal position, vertical position, rotational position, orientation, and/or physical space of the removable components 24, such as seats 32. The one or more sensor assemblies 90 may detect a body of the occupant (e.g., legs, arms, etc.). The ECU 22 may consider and/or compensate for the body of the occupant in determining positions and/or movement of the removable components 24. The bodies of the occupants may be included in the positions of the removable components 24 such that the ECU 22 may move the removable components 24 so bodies of occupants do not contact other removable component 24 and/or bodies of other occupants in the vehicle 26.

In embodiments, the ECU 22 may be configured to continuously monitor information (e.g., location, position, orientation, occupancy, and/or presence within vehicle 26, among others) pertaining to each of the removable components 24. For instance, the ECU 22 may be configured to detect when a change occurs to a removable component 24, such as when a removable component 24 moves to a new location within the vehicle 26, an occupancy change occurs, and/or a removable component 24 is added or removed from the vehicle 26, among others.

In embodiments, a system 20 may be configured for removable components 24 to be added and/or removed, such as during a particular operating cycle. An operating cycle may, for example and without limitation, start with a power-on of a vehicle 26 and end with a power-off of a vehicle 26. For instance, a vehicle 26 may be powered on and then one or more removable components 24 may be added to and/or removed from the vehicle 26 before the vehicle 26 is power off. The system 20 and/or an ECU 22 may determine which removable components 24 are present and/or connected at power-on. Additionally or alternatively, the system 20 and/or an ECU 22 may monitor for the addition, removal, connection, and/or disconnection of removable components 24 during an operating cycle (e.g., the system 20 may be a dynamic system).

In some situations, a removable component 24 may be present in a vehicle 26 at power-on but may not be directly connected (e.g., electrically/mechanically) to a mounting surface 30. During the operating cycle, such a removable component 24 may be connected to the mounting surface 30. For example and without limitation, an appliance 40 and/or a console 44 may be disposed on a seat 32 a power-on and may be connected to a track assembly 52 during the operating cycle.

In embodiments, the system 20 and/or an ECU 22 may be configured to compensate for the addition, removal, connection, and/or disconnection of removable components 24 in controlling operation and/or movement of other removable components 24.

Figure 7B:
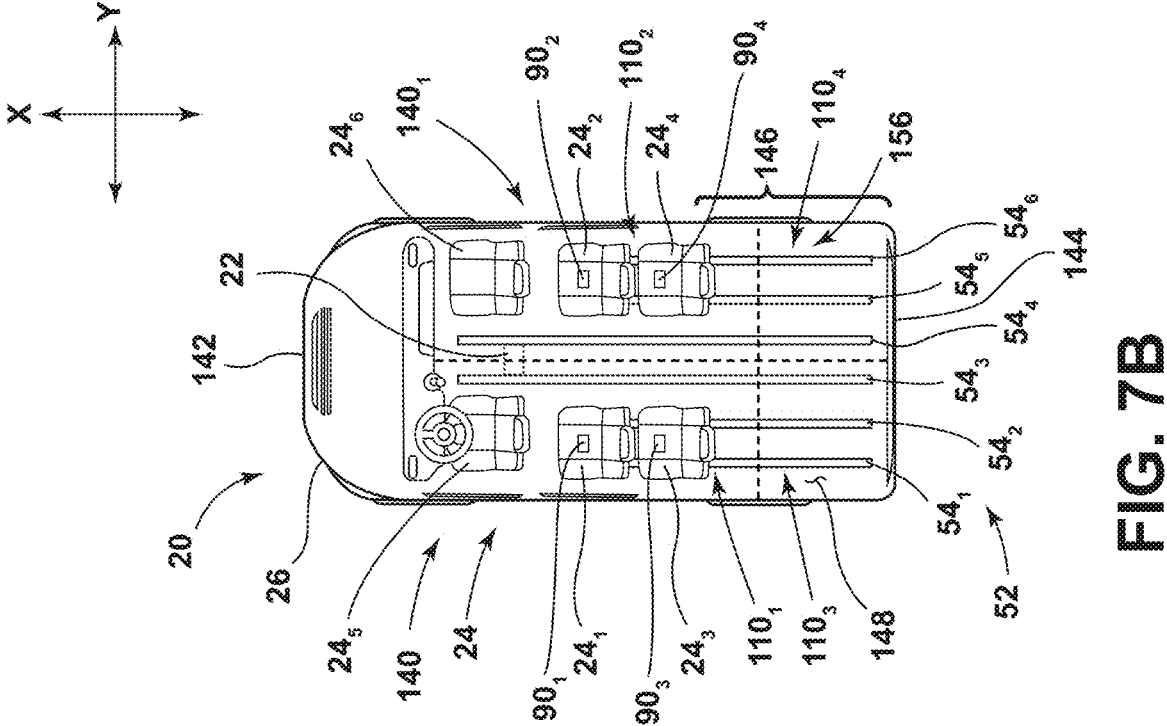
FIG. 7A-7E are top views of embodiments of removable component systems according to teachings of the present disclosure.
Figure 7A:
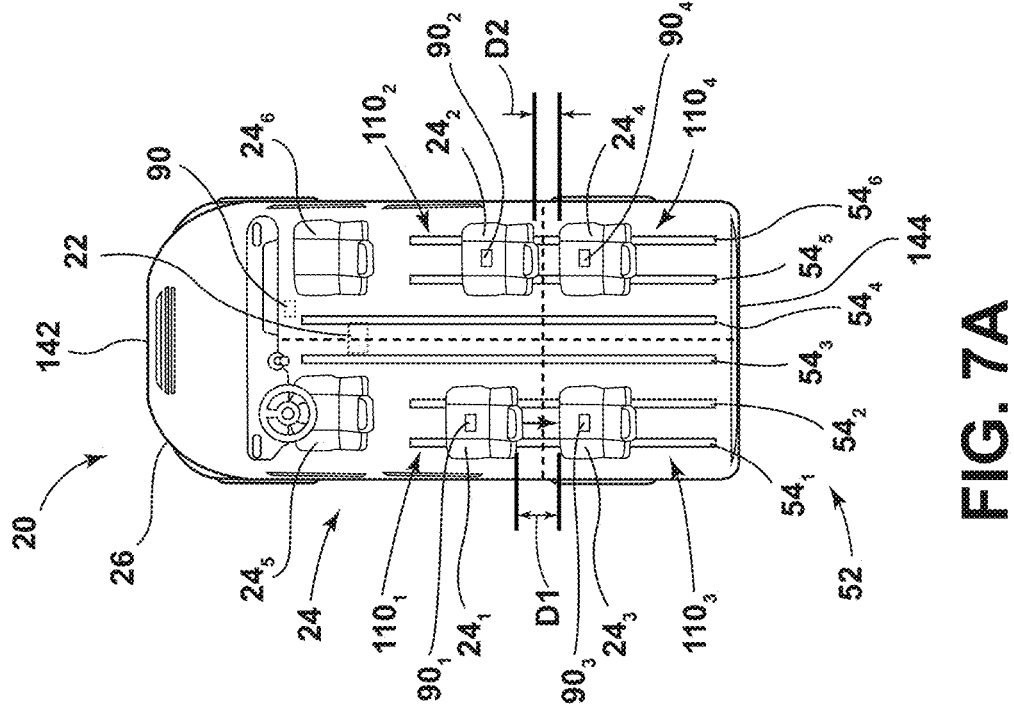

With embodiments, such as generally illustrated in FIGS. 7A and 7B, a vehicle 26 may include a plurality of zones 110 (e.g., areas, regions, etc.), such as a first zone 110₁, a second zone 110₂, a third zone 110₃, and/or a fourth zone 110₄. In some example configurations, the ECU 22, such as via the one or more sensor assemblies 90, may be configured to determine a zone location for each removable component 24. For instance, the sensor assemblies 90 may be configured to determine and/or provide information about which zone or zones of the plurality of zones 110 an existing removable component 24 is disposed in, a removable component 24 is added or connected to, and/or an existing component 24 is removed from.

In embodiments, the ECU 22 may be configured to modify movement of one or more removable components 24 based on the respective zone locations of the removable components 24. For instance, if a new removable component 24 (e.g., the third removable component 24₃) is added while an existing removable component 24 (e.g., the first removable component 24₁) is moving, the ECU 22 may be configured to at least temporarily stop movement of the existing removable component 24 to avoid a collision with the new removable component 24, if the new removable component 24 is located at least partially in the same zone 110 (e.g., the first zone 110₁) as the moving removable component 24 (see, e.g., FIG. 7B). Additionally or alternatively, the ECU 22 may be configured to at least temporarily restrict (e.g., slow, limit rotation angle, etc.) movement of the existing removable component 24 to avoid a collision with the new removable component 24 if the new removable component 24 is located at least partially in the same zone 110 as the removable component 24. If a removable component 24 is removed from a zone, the ECU 22 may increase the speed of movement of one or more remaining removable components 24, such as remaining removable components 24 that are in or moving to the same zone as removed removable component 24.

With embodiments, if a new removable component 24 (e.g., the third removable component 24₃) is added while a removable component 24 (e.g., the first removable component 24₁) is moving, the ECU 22 may be configured to at least temporarily stop movement of the existing removable component 24 to avoid a collision with the new removable component 24, if the existing removable component 24 is moving to a zone 110 (e.g., the third zone 110₃) in which the new removable component 24 is at least partially disposed (see, e.g., FIG. 7A). Additionally or alternatively, the ECU 22 may be configured to at least temporarily slow movement of the existing removable component 24 to avoid a collision with the new removable component 24 if the existing removable component 24 is moving to a zone 110 in which the new removable component 24 is at least partially disposed.

In embodiments, if another removable component 24 is removed, modifying movement of the first removable component 24₁ may, for example, include resuming movement of the first removable component 24₁ in a desired direction that had previously been slowed or stopped because of the presence of the removed removable component 24.

In embodiments, such as generally illustrated in FIGS. 7B-7E, an ECU 22 may receive an input (e.g., a request) from a user, such as via a user interface 130, to move the removable components 24 to a requested configuration 140, such as a first configuration 140₁, a second configuration 140₂, and/or a third configuration 140₃. The ECU 22 may determine the current position of the removable components 24 via the one or more sensor assemblies 90. The ECU 22 may determine a proposed movement path for each of the respective removable components 24 based on the input from the user interface 130. In some examples, the ECU 22 may be configured to determine the proposed movement path such that the path does not intersect with another path. The proposed movement path may, for example, include horizontal movement and/or rotational movement, which may or may not occur simultaneously.

In embodiments, the ECU 22 may prioritize movement of unoccupied removable components 24 including seats 32 over occupied removable components 24 including vehicle seats 32. In some instances, the ECU 22 may only move unoccupied removable components 24, while leaving occupied removable components 24 stationary. The ECU 22 may be configured to automatically fold unoccupied removable components 24 that include seats 32 prior to and/or while moving such as to decrease the amount of valuable vehicle space an unoccupied removable component consumes.

In some embodiments, the ECU 22 may not determine movement paths prior to starting movement of the removable components 24. For example, the ECU 22 may start moving removable components 24 in a desired direction and modify such movement if an obstruction is encountered/sensed.

With embodiments, such as generally illustrated in FIG. 7B, a user may request the removable components 24 to move to a first requested configuration 140I, which may correspond to an increased cargo space configuration. The ECU 22 may be configured to move the removable components 24 to increase cargo space 146 of a vehicle 26. In some instances, moving the removable components 24 toward the front 142 of the vehicle 26 may increase the cargo space 146 a surface area of the cargo space 148. In some examples, the ECU 22 may be configured to move the removable components 24 to provide the cargo space 146 with a rectangular prism having the largest volume (e.g., as opposed to several different/separate shapes combined for overall cargo space). Additionally or alternatively, the ECU 22 may be configured to move the removable components 24 to provide the cargo space 146 with a rectangle of floor/mounting surface space having the largest surface area. The ECU 22 may, for example and without limitation, determine where to move removable components 24 for the first requested configuration 1401 via an iterative process, which may involve generating a model of the vehicle 26 and/or the removable components 24 and moving the removable components to various positions until a maximized configuration is identified. Moving removable components 24 into the first requested configuration 1401 may, additionally or alternatively, folding some or all unoccupied seats 32 into a horizontal configuration (e.g., with a seat base 70 and seat back 72 substantially horizontal) or into a vertical configuration (see, FIG. 5D).

Figure 7D:
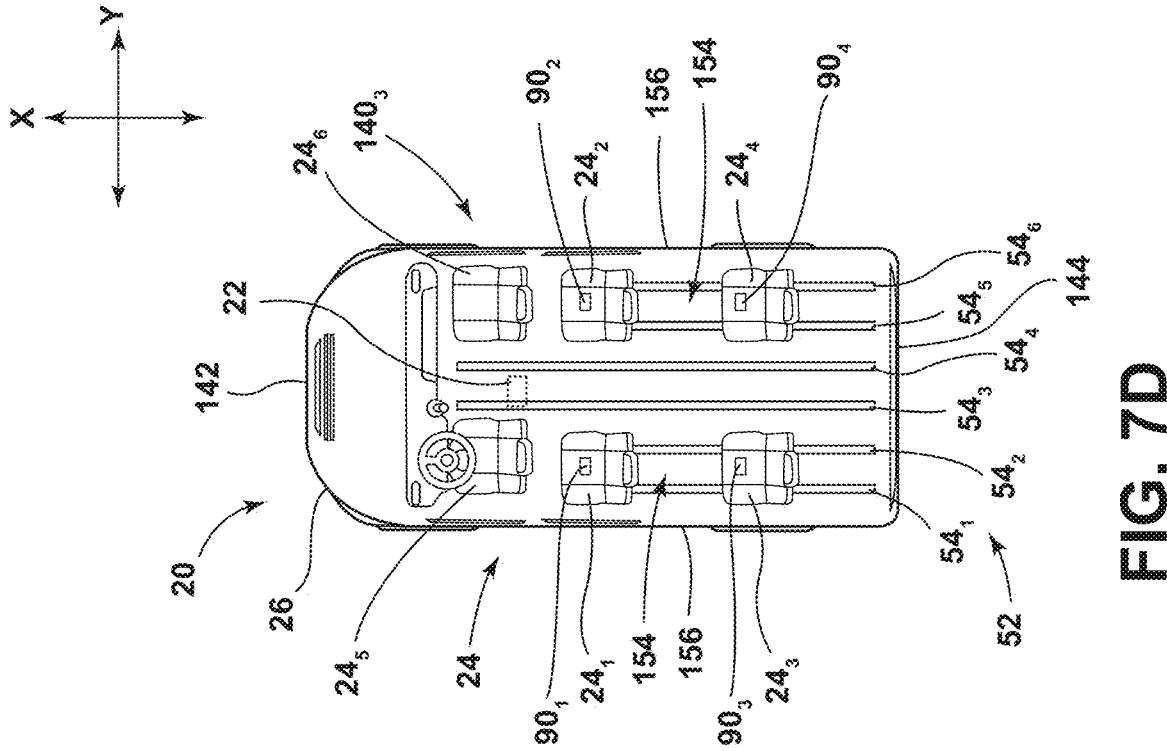
Figure 7C:
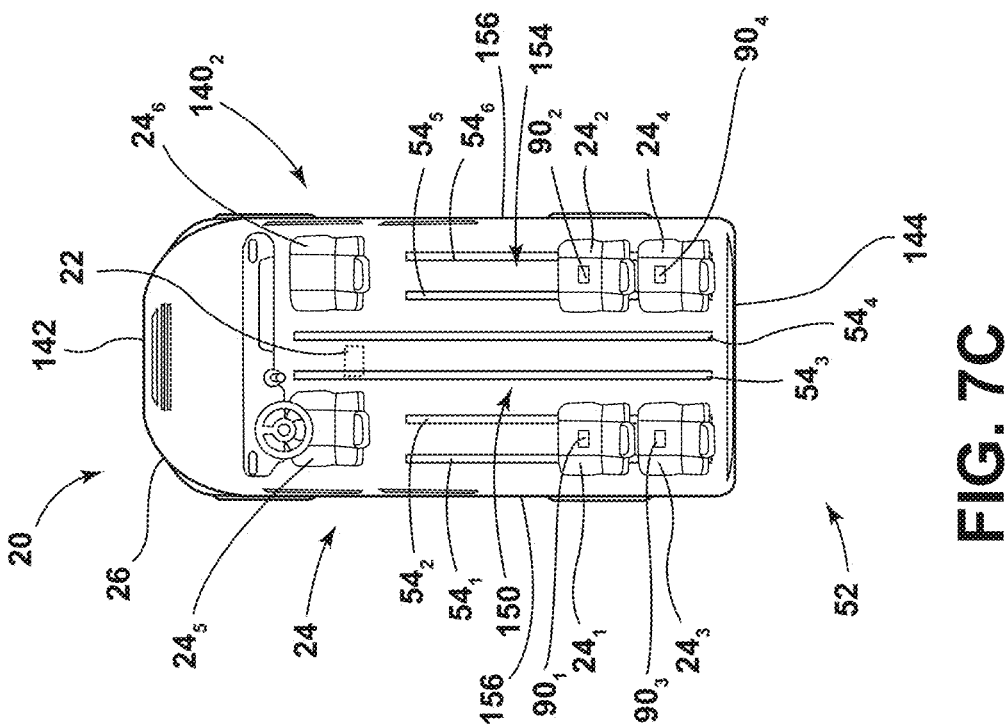

In embodiments, such as generally illustrated in FIG. 7C, a user may request the removable components 24 to move to a second requested configuration 140₂ which may involve disposing removable components 24 at or about the rear 144 of the vehicle 26. For example, the ECU 22 may move some or all unoccupied removable components 24 toward the rear 144 of the vehicle, which may maximize a user space 150.

With embodiments, such as generally illustrated in FIG. 7D, a user may request the removable components 24 to move to a third requested configuration 1403 (e.g., a user entry configuration). The ECU 22 may be configured to move the removable components 24 to provide space 154 for a user to enter a vehicle 26 by moving one or more removable components 24 away from a vehicle door 156 by at least a predetermined distance. For instance, the ECU 22 may be configured to move the first and second removable components 24₁, 24₂ towards a front 142 of the vehicle 26 and/or away from a vehicle door 156 such that the first removable component 24₁ is spaced apart from the third removable component 24₃, and the second removable component 24₂ is spaced apart from the fourth removable component 24₄ by a distance that corresponds to the opening of a vehicle door 156.

Figure 7E:
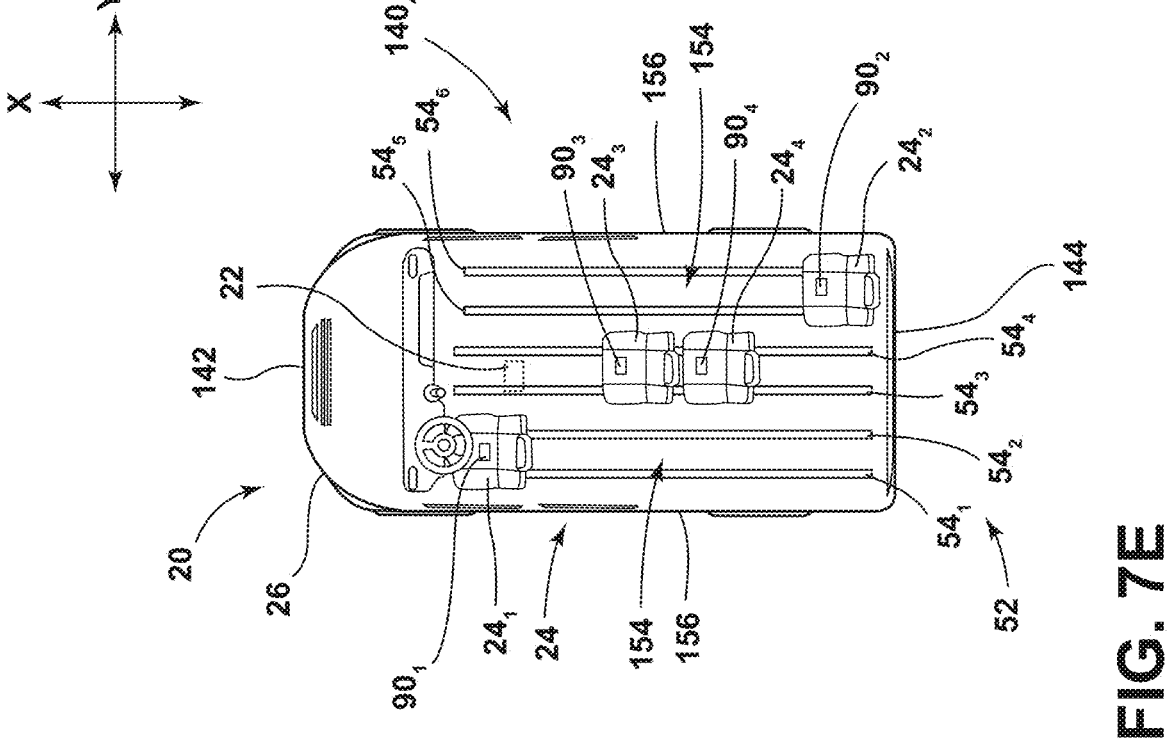
Figure 8:
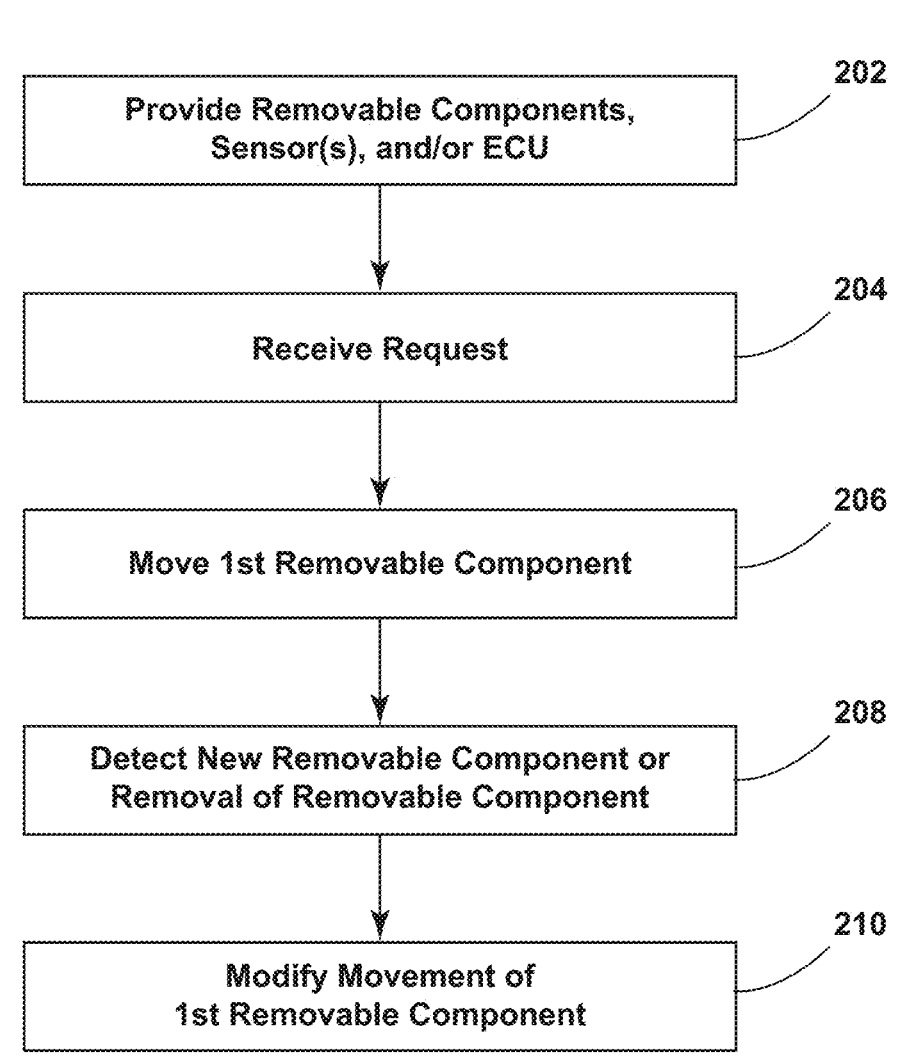
FIG. 8 is a flowchart generally illustrating an embodiment of a method of operating a removable component system.

With embodiments, such as generally illustrated in FIG. 7E, a user may request the removable components 24 to be moved to a fourth configuration 140₄ such that occupied removable components 24 are disposed at the greatest/maximized distance from each other. The ECU 22 may move removable components 24 to maximize the distance between occupied removable components. For example and without limitation, if removable components 24₁, 24₂ are occupied, the ECU 22 may move one or both such they are disposed in opposite corners of the vehicle 26. Such a configuration may, for example and without limitation, limit the transmission of sound, particles, disease, bacteria, viruses, etc. between occupants. In some instances, the ECU 22 may move unoccupied removable components 24 (e.g., removable components 24₃, 24₄), which may include non-seat components, between the occupied removable components 24₁, 24₂, which may act as a physical barrier between occupants/occupied removable components 24.

In embodiments, such as generally illustrated in FIG. 7A, the ECU 22 may receive an input from an occupant of a removable component 24 (e.g., removable component 24₁), such as via the user interface 130, to move to a desired position and/or in a desired movement direction. For instance, the occupant may desire to move the removable component 24 in a rearward direction (e.g., toward the rear 144 of the vehicle 26). The ECU 22 may be configured to determine an occupancy of another removable component 24 (e.g., removable component 24₃) disposed directly behind the removable component 24. The ECU 22 may be configured to move the removable component 24₁ such that the removable component 24₁ is spaced apart from the other removable component 24₃ by a first distance D1 if the ECU 22 determines that the other removable component 24₃ is occupied. The ECU 22 may be configured to move the removable component 24₁ such that the removable component 24₁ is spaced apart from the other removable component 24₃ by a second distance D2 if the ECU 22 determines that the other removable component 24₃ is unoccupied. The first distance D1 may be greater than the second distance D2.

With embodiments, if the ECU 22 receives a second input (e.g., a repeat request) from the occupant of the removable component 24₁ to continue to move the removable component 24₁ in a rearward direction, the ECU 22 may be configured to continue to move the removable component 24₁ such that the removable component 24₁ is spaced apart from the other removable component 24₃ by a minimum distance (smaller than the second distance D2) or is in contact with the other removable component 24₃ if the other removable component 24₃ is unoccupied (e.g., the ECU 22 may allow an occupant to stack its removable component 24₁ with an unoccupied removable component 24₃). Movement with the second distance D2 may be slower than movement outside the second distance D2.

With embodiments, such as generally illustrated in FIG. 7, a method 200 of operating a system 20 may include providing a vehicle 26, a plurality of removable components 24, an ECU 22, and/or one or more sensor assemblies 90 (step 202).

In some embodiments that include seats 32 and a vehicle 26, seats 32 may be disposed at different locations and/or in different arrangements within the vehicle 26. The arrangement of the vehicle seats 32 may be customizable. In some examples, a user (e.g., a driver of a vehicle, an occupant, an operator, a maintenance person or machine, etc.) may change the arrangement of and/or the number of removable components 24, which may include seats 32, while using one or more portions of a system 20, such as during operation of the vehicle 26.

In embodiments, the method 200 may include the ECU 22 receiving an input from a user (e.g., a user request) to move the one or more removable components 24 (step 204). The input may include a desired position and/or a desired movement/direction of one or more removable components 24. The ECU 22 may be connected to a user interface 130 (e.g., an electronic user interface) that may facilitate receiving input from a user. For example and without limitation, the user interface 130 may be buttons, switches, a joystick, a microphone for voice commands, a speaker, a display, and/or a touch screen that may be connected to the ECU 22 and/or one or more removable components 24, such as seats 32. Additionally and alternatively, the user interface 130 may be configured to read gestures (e.g., sign language, intuitive gestures, etc.) directed towards the camera 102 and/or a sensing pad on the removable component 24, such as generally described in commonly-owned U.S. Pat. No.

9,383,872, which is hereby incorporated by reference in its entirety. Portions of a user interface 130 may be disposed in a central location (e.g., on a vehicle dashboard) and/or portions of a user interface 130 may be disposed on or in a removable component 24. A user may input a desired movement and/or position of a removable component 24 and/or a removable component configuration via the user interface 130. The user interface 130 may include preset positions and/or configurations that a user may select from and/or the user may interact the user interface 130 until the desired position and/or configuration is reached.

With embodiments, the method 200 may including the ECU 22 moving one or more removable components 24 according, at least in part, to the input from the user (step 206). In some instances, the user input may include a desired configuration (e.g., configurations $140_{1-4}$) and the ECU 22 may move one or more removable components to achieve the desired configuration.

With embodiments, the method 200 may include detecting a new removable component 24 added to the vehicle 26 and/or removal of at least one of the removable components 24, such as while a first removable component $24_1$ is moving (step 208). In some instances, a user may desire to add and/or remove one or more removable components 24 during operation of a vehicle 26. An ECU 22 and/or one or more sensor assemblies 90 may be configured to detect and/or identify when a removable component 24 has been added and/or removed during operation of the vehicle 26. For instance, the ECU 22 and/or the sensor assemblies 90 may continuously monitor the status of each respective removable components 24 within the vehicle 26. For example and without limitation, when a new removable component 24 is added, the ECU 22 may be configured to establish communication with the new removable component 24 (e.g., with the respective component controller 25) and/or the sensor assemblies 90 may be configured to detect the presence of the new removable component 24 (e.g., location of the removable component within the vehicle). When a removable component 24 is removed from the vehicle 26, the ECU 22 may be configured to determine that there is no longer communication with the removable component 24 and/or the sensor assemblies 90 may be configured to determine that the location of the removable component 24 is no longer in the vehicle 26.

In embodiments, the method 200 may include modifying the movement of the one or more removable components 24 (e.g., the first removable component $24_1$) according to the detected new removable component 24 and/or the removal of at least one of the removable components 24 (step 210). For example and without limitation, if a removable component 24 (e.g., the third removable component $24_3$) is added while the first removable component $24_1$ is moving, the ECU 22 may be configured to at least temporarily stop and/or slow movement of the first removable component $24_1$ to avoid a collision with the new removable component 24 (e.g., the third removable component $24_3$).

While example embodiments of systems 20 and methods 200 may be described/depicted in connection with vehicles 26 including at least four vehicle seats 32 for the purposes of illustration, systems 20 and methods 200 are not limited to vehicle applications, systems 20 and methods 200 may involve more or less than four vehicle seats 32 (e.g., in some cases, none), and systems 20 and methods 200 may involve other removable components 24, such as components 34-48, for example.

In examples, an ECU (e.g., ECU 22) and/or an electronic controller (e.g., component controller 25) may include an electronic controller and/or include an electronic processor, such as a programmable microprocessor and/or microcontroller. In embodiments, an ECU and/or an electronic controller may include, for example, an application specific integrated circuit (ASIC). An ECU and/or an electronic controller may include a central processing unit (CPU), a memory (e.g., a non-transitory computer-readable storage medium), and/or an input/output (I/O) interface. An ECU and/or an electronic controller may be configured to perform various functions, including those described in greater detail herein, with appropriate programming instructions and/or code embodied in software, hardware, and/or other medium. In embodiments, an ECU and/or an electronic controller may include a plurality of controllers. In embodiments, an ECU and/or an electronic controller may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer/computing device, an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method of operating a removable component system, the system including a vehicle comprising a plurality of zones, a plurality of removable components positioned within the plurality of zones, one or more sensor assemblies, and an electronic control unit, the method comprising:

moving, by the electronic control unit, a first removable component of the plurality of removable components relative to a mounting surface of the vehicle;

detecting a location of a zone of the plurality of zones associated with a new removable component or removal of at least one of the plurality of removable components, by the one or more sensor assemblies, while moving the first removable component;

modifying the movement of the first removable component according to the detected location of the zone of the new removable component or the at least one removed removable component.

2. The method of claim 1, wherein the electronic control unit is configured to move the removable components longitudinally, laterally, rotationally, vertically, and angularly.

3. The method of claim 1, including determining, by the one or more sensor assemblies, a location of the new removable component.

4. The method of claim 1, including identifying each removable component within the vehicle.

5. The method of claim 1, including receiving a user request, wherein moving the first removable component includes moving the first removable component, at least in part, according to the user request.

6. The method of claim 1, wherein modifying movement of the first removable component further includes at least temporarily stopping movement of the first removable component, by the electronic control unit, to avoid a collision of the first removable component and the new removable component.

7. The method of claim 1, wherein modifying movement of the first removable component further includes (i) if the new removable component is detected, at least temporarily limiting movement of the first removable component, by the electronic control unit, to avoid a collision of the first removable component and the new removable component, or (ii) if removal is detected, increasing a speed of movement of a remaining removable component of the plurality of removable components.

8. The method of claim 1, further comprising determining, via the one or more sensor assemblies, a location of a zone for each removable component.

9. The method of claim 8, wherein modifying movement of the first removable component further includes at least one of temporarily stopping and limiting movement of the first removable component, by the electronic control unit, if the new removable component is disposed at least partially in a same zone of the plurality of zones as the first removable component.

10. The method of claim 1, wherein modifying movement of the first removable component further includes at least one of temporarily stopping and slowing movement of the first removable component, by the electronic control unit, if the new removable component is located in the zone of the plurality of zones that the first removable component is moving to.

11. The method of claim 1, wherein the removable components are configured for selective connection with, movement along and relative to, and removal from one or more track assemblies connected with said mounting surface, and at least some of the removable components are configured for electrical connection with said one or more track assemblies.

12. The method of claim 1, including determining, by the electronic control unit, an occupancy of the plurality of removable components, wherein moving the first removable component further includes moving the first removable component such that the first removable component is spaced from a second removable component by a first distance if the second removable component is occupied and by a second distance if the second removable component is unoccupied.

13. The method of claim 12, wherein the first distance is greater than the second distance.

14. The method of claim 13, including receiving a first request;

receiving a second request; and moving the first removable component within the second distance in response to the second request if the second removable component is unoccupied, wherein moving the first removable component such that the first removable component is spaced from the second removable component includes moving the first removable component according to the first request.

15. The method of claim 1, including receiving a user request, wherein the user request corresponds to a cargo configuration, and moving the first removable component further includes moving the first removable component to maximize a rectangular surface area of cargo space of the vehicle.

16. The method of claim 1, including receiving a user request, wherein the user request corresponds to a rear configuration, and moving the first removable component further includes moving the first removable component toward a rear of the vehicle.

17. The method of claim 1, including:

receiving a user request for movement of one or more of the plurality of removable components;

determining that at least one of the first removable component and a second removable component of the plurality of removable components are occupied;

moving, by the electronic control unit, the second removable component such that a distance between the first removable component and the second removable component is maximized; and moving one or more unoccupied removable components of the plurality of removable components between the first and second removable components to provide a physical barrier between the first removable component and the second removable component.

18. A method of operating a removable component system, the system including a vehicle, a plurality of removable components, one or more sensor assemblies, and an electronic control unit, the method comprising:

receiving a user request for movement of one or more of the plurality of removable components;

determining an occupancy status of the plurality of removable components; and moving, by the electronic control unit, occupied removable components of the plurality of removable components relative to a mounting surface of the vehicle such that a distance between the occupied removable components is maximized.

19. The method of claim 18, including moving one or more unoccupied removable components of the plurality of removable components between at least two of the occupied removable components to provide a physical barrier between the at least two occupied removable components.

* * * * *